US009000898B2

(12) United States Patent
Matthews et al.

(10) Patent No.: US 9,000,898 B2
(45) Date of Patent: Apr. 7, 2015

(54) ELECTROHYDRAULIC CONTROLLER FEEDBACK SYSTEM AND METHOD

(75) Inventors: James D. Matthews, East Moline, IL (US); Daniel J. Wallace, Iowa City, IA (US)

(73) Assignee: Deere & Company, Moline, IL (US)

( * ) Notice: Subject to any disclaimer, the term of this patent is extended or adjusted under 35 U.S.C. 154(b) by 281 days.

(21) Appl. No.: 13/587,313

(22) Filed: Aug. 16, 2012

(65) Prior Publication Data

US 2014/0047824 A1 Feb. 20, 2014

(51) Int. Cl.

| | |
|---|---|
| ***H04B 3/36*** | (2006.01) |
| ***G06F 3/01*** | (2006.01) |
| ***F15B 13/14*** | (2006.01) |
| *G05G 5/03* | (2008.04) |

(52) U.S. Cl.
CPC *F15B 13/14* (2013.01); *G05G 5/03* (2013.01); *F15B 2211/6346* (2013.01)

(58) Field of Classification Search
CPC .... F15B 13/14; F15B 2211/6346; G05G 5/03
USPC ................................ 340/407.1; 715/700–702
See application file for complete search history.

(56) References Cited

U.S. PATENT DOCUMENTS 6,693,622 B1 * 2/2004 Shahoian et al. ............. 345/156
6,836,982 B1 * 1/2005 Augustine ....................... 37/348
2011/0291820 A1 * 12/2011 Krahenbuhl et al. ...... 340/407.2

* cited by examiner

*Primary Examiner* — Brian Zimmerman
*Assistant Examiner* — Thomas McCormack
(74) *Attorney, Agent, or Firm* — Taft Stettinius & Hollister, LLP; Stephen F. Rost

(57) ABSTRACT

An electrohydraulic controller feedback system and method including an electrohydraulic operator controller and a feedback mechanism is disclosed. An operator controls a machine hydraulic function using the electrohydraulic operator controller, the feedback system senses a property of the hydraulic function, and generates tactile feedback in the electrohydraulic operator controller based on the sensed property. The electrohydraulic operator controller can be, for example, a joystick or control lever. The tactile feedback can be vibrations that vary based on the sensed property. The vibration can vary according to a profile relating the vibration amount to the sensed property. The profile can include portions of various shapes, for example, linear, exponential or parabolic, and can include breakpoints. The profile can include high sensitivity regions where small changes in the sensed property result in large vibration changes.

20 Claims, 2 Drawing Sheets

ELECTROHYDRAULIC CONTROLLER FEEDBACK SYSTEM AND METHOD

FIELD OF THE INVENTION

The present invention generally relates to the field of machine-operator interfaces and more specifically to sensory feedback for electrohydraulic controls.

BACKGROUND OF THE INVENTION

Electrohydraulic controls have become more standard in machine operator stations in an attempt to reduce operator effort and improve ergonomics. Electrohydraulic systems typically employ some type of commanded electronic signal to activate hydraulic functions. Traditional machine operators are accustomed to mechanically actuated hydraulic valves in which a physical linkage connects the control lever to the hydraulic control valve. Due to the direct acting linkage, standard hydraulic controls inherently provide a tactile feedback that the operator can use to be more accurate and precise in his/her machine operation. This sensory feedback may be largely attributed to the variable flow forces created by the hydraulic fluid acting on the hydraulic control valve at various valve spool positions.

Machine operators that are familiar with operating equipment that have mechanically actuated hydraulic valves indicate difficulty adjusting to electrohydraulic controls largely because of the lack of feedback from the control levers. When actuating a hydraulic function with an electronic joystick, it is very difficult to discern between a very small operator command and a large operator command because no sensory stimulus is produced other than lever effort and position required to adjust the lever. As a result, operators indicate a heavier reliance upon their visual senses to operate electrohydraulic controls.

SUMMARY

An exemplary electrohydraulic controller feedback system is disclosed that includes an electrohydraulic operator controller and a feedback mechanism. The electrohydraulic operator controller enables an operator to control a machine hydraulic function. The feedback system senses a property of the machine hydraulic function, and generates tactile feedback in the electrohydraulic operator controller based on the sensed property of the machine hydraulic function. The electrohydraulic operator controller can control the machine hydraulic function through an electrohydraulic machine controller, and the feedback mechanism can sense the property of the machine hydraulic function through the electrohydraulic machine controller. The electrohydraulic operator controller can be, for example, a joystick or a control lever. The tactile feedback generated in the electrohydraulic operator controller can be a vibration that varies in frequency or amplitude based on the sensed property of the machine hydraulic function. The frequency and/or amplitude of the vibration can vary based on the sensed property of the machine hydraulic function.

An exemplary electrohydraulic controller feedback system is disclosed that includes an electrohydraulic operator controller, an electrohydraulic machine controller and a feedback mechanism. The electrohydraulic operator controller enables physical operator control of a machine hydraulic function. The electrohydraulic machine controller is coupled to the electrohydraulic operator controller. The electrohydraulic machine controller receives an electrical input signal from the electrohydraulic operator controller based on the physical positioning of the electrohydraulic operator controller by the operator, generates an output signal based on the electrical input signal from the electrohydraulic operator controller, sends the output signal to control valves to control the machine hydraulic function, and senses a property of the machine hydraulic function. The feedback mechanism is coupled to the electrohydraulic machine controller and to the electrohydraulic operator controller. The electrohydraulic machine controller sends a sensor signal indicating the property of the machine hydraulic function to the feedback mechanism, and the feedback mechanism generates tactile feedback in the electrohydraulic operator controller based on the sensor signal from the electrohydraulic machine controller. The electrohydraulic operator controller can be, for example, a joystick or a control lever.

The tactile feedback generated in the electrohydraulic operator controller can be a vibration that varies based on the sensed property of the machine hydraulic function. The vibration can vary according to a user selectable profile. The profile can include a breakpoint, the vibration increasing for increasing values of the sensed property of the machine hydraulic function up to the breakpoint, and the vibration ceasing when the sensed property of the machine hydraulic function exceeds the breakpoint. The breakpoint can be selected to be in a region where the machine hydraulic function can be sensed visually by the operator. The profile can include multiple breakpoints. For example, the vibration can increase for increasing values of the sensed property of the machine hydraulic function up to the first breakpoint, the vibration can decrease for increasing values of the sensed property of the machine hydraulic function between the first breakpoint and the second breakpoint, and the vibration can cease when the sensed property of the machine hydraulic function exceeds the second breakpoint. The profile can include portions of various shapes including, for example, linear portions, exponential portions or other shaped portions. The profile can include a high sensitivity region where small changes in values of the sensed property of the machine hydraulic function result in large changes in the vibration.

A method for providing electrohydraulic controller feedback is disclosed that includes controlling a machine hydraulic function using an electrohydraulic operator controller, sensing a property of the machine hydraulic function, and generating tactile feedback in the electrohydraulic operator controller based on the sensed property of the machine hydraulic function. Generating tactile feedback in the electrohydraulic operator controller can include causing the electrohydraulic operator controller to vibrate, and varying the vibration based on the sensed property of the machine hydraulic function. Controlling a hydraulic function using an electrohydraulic operator controller can include sending an electrical signal to an electrohydraulic machine controller based on the physical positioning of the electrohydraulic operator controller, generating an output signal from the electrohydraulic machine controller based on the electrical signal from the electrohydraulic operator controller, and sending the output signal to control valves to control the machine hydraulic function. Sensing a property of the hydraulic function can include sensing a property of the machine hydraulic function using the electrohydraulic machine controller, and sending a sensor signal to a feedback mechanism, the sensor signal indicating the sensed property of the machine hydraulic function. Varying the vibration based on the sensed property of the machine hydraulic function can include varying the vibration according to a profile relating the vibration frequency to the machine hydraulic function.

DETAILED DESCRIPTION

Figure 1:
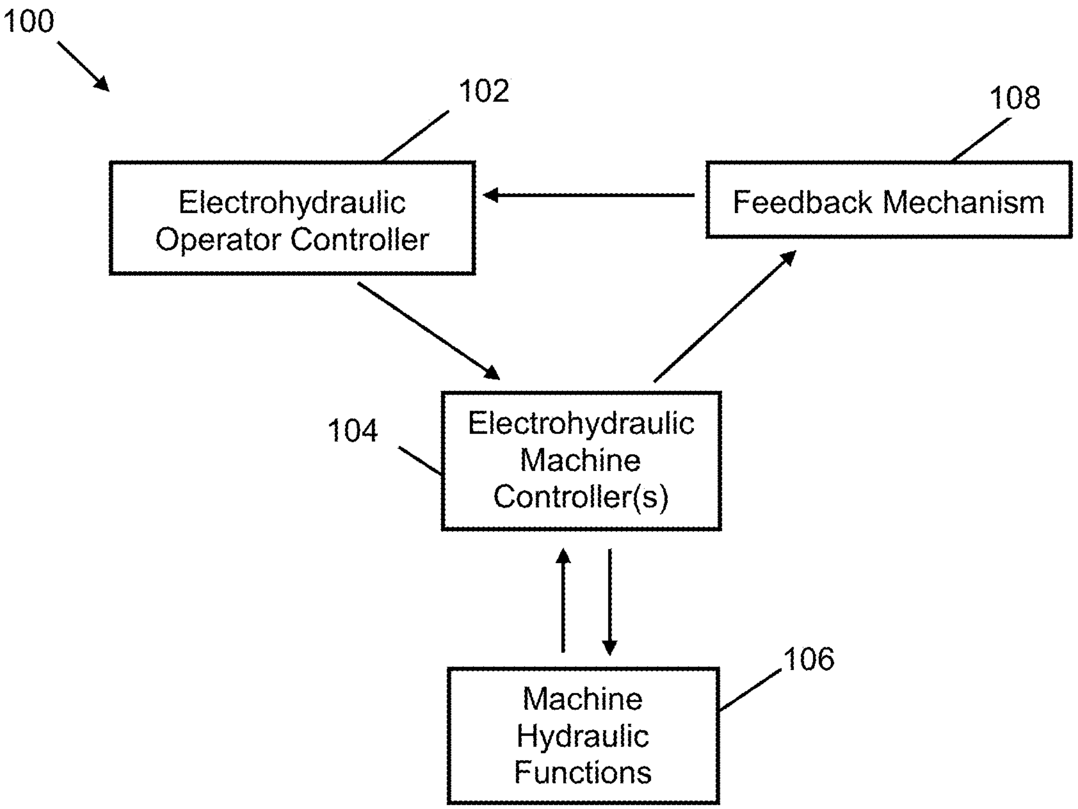
FIG. 1 shows an overview of an exemplary feedback system.

For the purposes of promoting an understanding of the principles of the novel invention, reference will now be made to the embodiments described herein and illustrated in the drawings and specific language will be used to describe the same. It will nevertheless be understood that no limitation of the scope of the novel invention is thereby intended, such alterations and further modifications in the illustrated devices and methods, and such further applications of the principles of the novel invention as illustrated therein being contemplated as would normally occur to one skilled in the art to which the novel invention relates.

Electrohydraulic control lever feedback provides mechanical feedback to the operator using vibrations or other tactile feedback based upon a given commanded operator input. This tactile feedback mechanism which is inherently lacking in electrohydraulic control systems can help the machine operator monitor the machine hydraulics. For example, an operator control lever or joystick can vibrate based on the initiation and metering of hydraulic fluid flow inside an electrohydraulic control valve. The feedback mechanism can be designed to emulate the 'feel' of standard mechanically actuated valves. The feedback mechanism can be used by the machine operator to discern relationships between the physical operator input command and the machine behavior. The tactile feedback provided to the joystick enables the machine operator to more effectively and efficiently gauge the hydraulic functions' response by sense of touch rather than just visual feedback.

FIG. 1 illustrates an overview of an exemplary embodiment of an electrohydraulic controller feedback system 100 that can be used in a typical machine configuration. The system 100 includes an electrohydraulic operator controller 102 (for example a joystick or control lever) that sends commands to electrohydraulic machine controller(s) 104 that in turn control the machine hydraulic functions 106. The electrohydraulic machine controller(s) 104 also monitor the status of the machine hydraulic functions 106 and provide this information to a feedback mechanism 108. The feedback mechanism 108 provides tactile feedback to the electrohydraulic operator controller 102 based on the information sensed by the electrohydraulic machine controller 104. The electrohydraulic machine controller 104 can include pressure sensors, flow rate sensors and/or other types of sensors to monitor the status of the machine hydraulic functions 106.

First, the machine operator commands a function by physically actuating the electrohydraulic operator controller 102. In response to the physical operator input, the electrohydraulic operator controller 102 generates an electrical signal that is sent to the electrohydraulic machine controller 104 to be processed. Upon receiving the electrical input signal, the electrohydraulic machine controller 104 subsequently sends an output signal to electrohydraulic control valve(s) to control machine hydraulic functions 106. Simultaneously, the electrohydraulic machine controller 104 senses properties of the machine hydraulic functions 106 and sends an electrical output signal to the feedback mechanism 108. The feedback mechanism 108 generates tactile feedback, for example vibrations, in the electrohydraulic operator controller 102 based on the signal from the electrohydraulic machine controller 104. Thus, the tactile feedback to the electrohydraulic operator controller 102 varies depending upon the status of the machine hydraulic functions 106 which vary depending upon the input commanded by the operator.

FIGS. 2-5 show some exemplary feedback relationships or profiles that can be implemented by the feedback mechanism 108. In these exemplary profiles, the X-axis shows the hydraulic function response 106 (for example, percent of maximum flow) to the operator input through the controller 102 and the Y-axis shows the amount of tactile motion (for example, frequency or number of pulses per second) fed back to the controller 102 by the feedback mechanism 108. The feedback profiles can be user selectable, enabling the user to select a generally preferred profile, or a profile preferred for a particular function. An example of hydraulic function response that can be used by the feedback system is the rate of hydraulic flow dedicated to a given hydraulic function. Some examples of tactile motion fed back to the controller 102 are frequency and/or amplitude of controller motion. The feedback to the electrohydraulic operator controller 102 can increase based on the feedback relationship without the resistance to movement of the controller increasing as in mechanically actuated hydraulic valves in which a physical linkage connects the operator controller 102 to the machine hydraulic functions 106.

For large hydraulic function responses (large X-values) the machine function movement is easily seen by the operator and the tactile feedback through the controller 102 is not usually as important. When the hydraulic function response is relatively small (small X-values) where the machine function movement is not easily seen, the tactile feedback through the controller 102 is more important and may be the only feedback from the machine hydraulic function 106 sensed by the operator.

Figure 2:
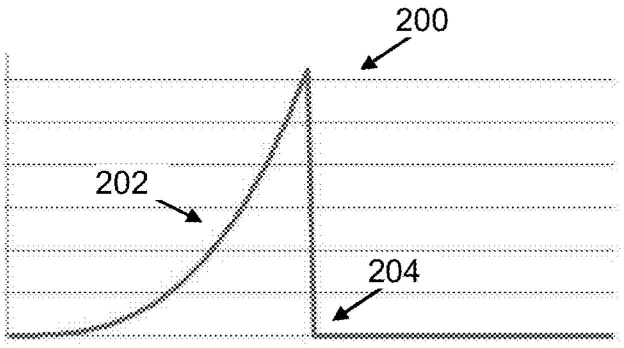
FIG. 2 shows an exemplary exponentially increasing feedback profile.

FIG. 2 shows an exemplary exponentially increasing feedback profile 200 with a breakpoint. For the feedback profile 200, the feedback to the operator controller 102 increases along an exponentially increasing portion 202 as the sensed hydraulic function response increases until the hydraulic function response reaches a breakpoint 204, and there is no feedback to the operator controller 102 for hydraulic function response beyond the breakpoint 204. The breakpoint 204 can be set to be in a region where hydraulic function movement can be readily seen by the operator.

Figure 3:
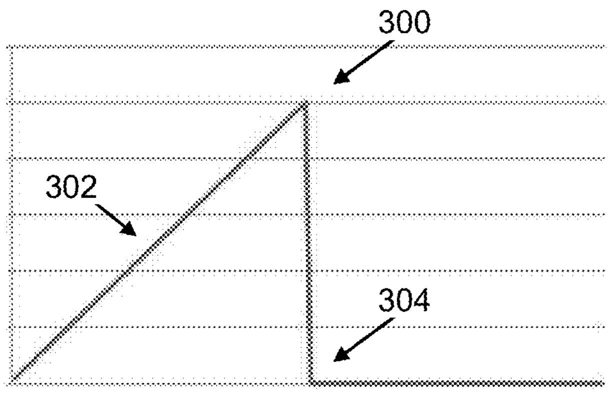
FIG. 3 shows an exemplary linearly increasing feedback profile.

FIG. 3 shows an exemplary linearly increasing feedback profile 300 with a breakpoint. For the feedback profile 300, the feedback to the operator controller 102 increases along a linearly increasing portion 302 as the sensed hydraulic function response increases until the hydraulic function response reaches a breakpoint 304, and there is no feedback to the operator controller 102 for hydraulic function response beyond the breakpoint 304. The breakpoint 304 can be set to be in a region where hydraulic function movement can be readily seen by the operator.

Figure 4:
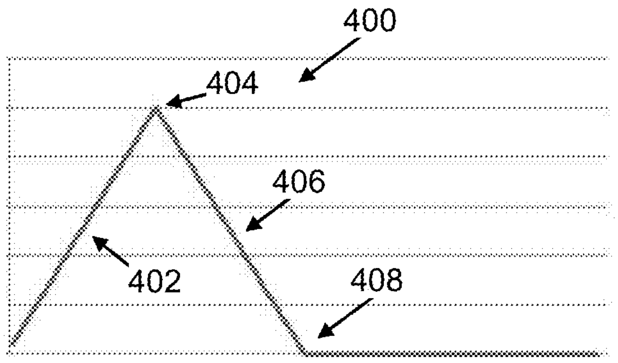
FIG. 4 shows an exemplary linearly increasing and then decreasing feedback profile.

FIG. 4 shows an exemplary linearly increasing and then decreasing feedback profile 400. For the feedback profile 400, the feedback to the operator controller 102 increases along a linearly increasing portion 402 as the sensed hydraulic function response increases until the hydraulic function response reaches a first breakpoint 404 at which point the feedback to the operator controller 102 begins decreasing along a linearly decreasing portion 404 as the sensed hydraulic function response continues increasing until the hydraulic function response reaches a second breakpoint 408 at which point the feedback to the operator controller 102 ceases as the sensed hydraulic function response continues increasing and there is no feedback beyond the breakpoint 408. The breakpoint 404 can be set to a region where hydraulic function movement starts to be seen by the operator and the breakpoint 408 can be set to a region where hydraulic function movement is easily seen by the operator.

Figure 5:
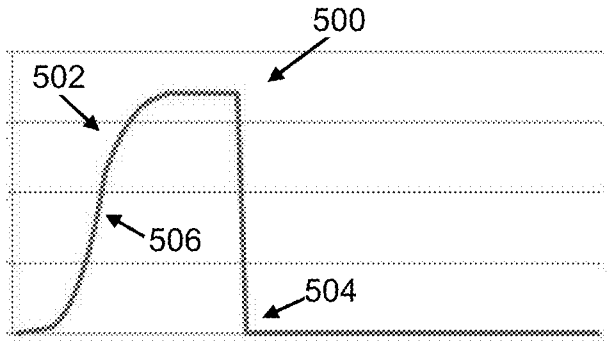
FIG. 5 shows an exemplary high-sensitivity region feedback profile.

FIG. 5 shows an exemplary logistic function feedback profile 500 with a breakpoint. For the feedback profile 500, the feedback to the operator controller 102 increases along a logistic-shaped portion 502 as the sensed hydraulic function response increases until the hydraulic function response reaches a breakpoint 504 at which point the feedback to the operator controller 102 ceases and there is no feedback beyond the breakpoint 504. The logistic feedback profile 500 includes a high-sensitivity region 506 with a steep slope where small changes in hydraulic function response result in large changes in tactile feedback. The high-sensitivity region 506 can be set to be in a region where there is a high sensitivity to small changes in the machine hydraulic function 106. The breakpoint 504 can be set to be in a region where hydraulic function movement can be readily seen by the operator.

While exemplary embodiments incorporating the principles of the present invention have been disclosed hereinabove, the present invention is not limited to the disclosed embodiments. Instead, this application is intended to cover any variations, uses, or adaptations of the invention using its general principles. Further, this application is intended to cover such departures from the present disclosure as come within known or customary practice in the art to which this invention pertains.

We claim:

1. An electrohydraulic controller feedback system comprising:

an electrohydraulic operator controller for operator control of a machine hydraulic function;

a feedback mechanism for sensing a property of the machine hydraulic function and for generating tactile feedback in the electrohydraulic operator controller based on the sensed property of the machine hydraulic function;

wherein the tactile feedback varies according to a user-selectable profile, the user-selectable profile including a breakpoint, the tactile feedback being related to the sensed property of the machine hydraulic function by a first relationship for values of the sensed property less than the breakpoint and the tactile feedback being related to the sensed property of the machine hydraulic function by a second relationship for values of the sensed property greater than the breakpoint, the second relationship being different than the first relationship.

2. The electrohydraulic controller feedback system of claim 1, wherein:

the electrohydraulic operator controller controls the machine hydraulic function through an electrohydraulic machine controller; and the feedback mechanism senses the property of the machine hydraulic function through the electrohydraulic machine controller.

3. The electrohydraulic controller feedback system of claim 1, wherein the electrohydraulic operator controller is one of a joystick and a control lever.

4. The electrohydraulic controller feedback system of claim 1, wherein the tactile feedback generated in the electrohydraulic operator controller is a vibration that varies based on the sensed property of the machine hydraulic function.

5. The electrohydraulic controller feedback system of claim 4, wherein the frequency of the vibration varies based on the sensed property of the machine hydraulic function.

6. The electrohydraulic controller feedback system of claim 4, wherein the amplitude of the vibration varies based on the sensed property of the machine hydraulic function.

7. An electrohydraulic controller feedback system comprising:

an electrohydraulic operator controller for physical operator control of a machine hydraulic function;

an electrohydraulic machine controller coupled to the electrohydraulic operator controller, the electrohydraulic machine controller receiving an electrical input signal from the electrohydraulic operator controller based on the physical positioning of the electrohydraulic operator controller by the operator, the electrohydraulic machine controller generating an output signal based on the electrical input signal from the electrohydraulic operator controller and sending the output signal to control valves to control the machine hydraulic function, the electrohydraulic machine controller also sensing a sensed property of the machine hydraulic function;

a feedback mechanism coupled to the electrohydraulic machine controller and to the electrohydraulic operator controller, the electrohydraulic machine controller sending a sensor signal indicating the sensed property of the machine hydraulic function to the feedback mechanism, the feedback mechanism generating a feedback signal to cause tactile feedback in the electrohydraulic operator controller based on the sensor signal from the electrohydraulic machine controller;

wherein the tactile feedback in the electrohydraulic operator controller varies according to a user-selectable profile, the user-selectable profile including a first breakpoint, the tactile feedback being related to the sensed property of the machine hydraulic function by a first relationship for values of the sensed property less than the first breakpoint and the tactile feedback being related to the sensed property of the machine hydraulic function by a second relationship for values of the sensed property greater than the first breakpoint, the second relationship being different than the first relationship.

8. The electrohydraulic controller feedback system of claim 7, wherein the electrohydraulic operator controller is one of a joystick and a control lever.

9. The electrohydraulic controller feedback system of claim 7, wherein the tactile feedback generated in the electrohydraulic operator controller is a vibration that varies based on the sensed property of the machine hydraulic function.

10. The electrohydraulic controller feedback system of claim 7, wherein the vibration increases for increasing values of the sensed property of the machine hydraulic function up to the first breakpoint, and the vibration ceases when the sensed property of the machine hydraulic function exceeds the first breakpoint.

11. The electrohydraulic controller feedback system of claim 10, wherein the first breakpoint is selected to be in a region where the machine hydraulic function can be sensed visually by the operator.

12. The electrohydraulic controller feedback system of claim 7, wherein the profile includes a second breakpoint, the second breakpoint being greater than the first breakpoint, the vibration increasing for increasing values of the sensed property of the machine hydraulic function up to the first breakpoint, the vibration decreasing for increasing values of the sensed property of the machine hydraulic function between the first breakpoint and the second breakpoint, and the vibration ceasing when the sensed property of the machine hydraulic function exceeds the second breakpoint.

13. The electrohydraulic controller feedback system of claim 7, wherein the profile includes a logistic function shape.

14. The electrohydraulic controller feedback system of claim 13, wherein the vibration increases according to the logistic function shape for increasing values of the sensed property of the machine hydraulic function up to the first breakpoint, and the vibration ceases when the sensed property of the machine hydraulic function exceeds the first breakpoint.

15. An electrohydraulic controller feedback system of claim 10, comprising:

an electrohydraulic operator controller for physical operator control of a machine hydraulic function;

an electrohydraulic machine controller coupled to the electrohydraulic operator controller, the electrohydraulic machine controller receiving an electrical input signal from the electrohydraulic operator controller based on the physical positioning of the electrohydraulic operator controller by the operator, the electrohydraulic machine controller generating an output signal based on the electrical input signal from the electrohydraulic operator controller and sending the output signal to control valves to control the machine hydraulic function, the electrohydraulic machine controller also sensing a sensed property of the machine hydraulic function;

a feedback mechanism coupled to the electrohydraulic machine controller and to the electrohydraulic operator controller, the electrohydraulic machine controller sending a sensor signal indicating the sensed property of the machine hydraulic function to the feedback mechanism, the feedback mechanism generating a feedback signal to cause tactile feedback in the electrohydraulic operator controller based on the sensor signal from the electrohydraulic machine controller;

wherein the tactile feedback generated in the electrohydraulic operator controller is a vibration that varies based on the sensed property of the machine hydraulic function, the vibration varying according to a user selectable profile that includes a high sensitivity region where small changes in values of the sensed property of the machine hydraulic function result in large changes in the vibration.

16. A method for providing electrohydraulic controller feedback, the method comprising:

controlling a machine hydraulic function using an electrohydraulic operator controller;

sensing a sensed property of the machine hydraulic function;

generating tactile feedback in the electrohydraulic operator controller based on the sensed property of the machine hydraulic function;

varying the tactile feedback in the electrohydraulic operator controller according to a user-selectable profile including a breakpoint;

varying the tactile feedback based on to the sensed property of the machine hydraulic function according to a first relationship for values of the sensed property less than the first breakpoint; and varying the tactile feedback based on the sensed property of the machine hydraulic function according to a second relationship for values of the sensed property greater than the first breakpoint, the second relationship being different than the first relationship.

17. The method of claim 16, wherein generating tactile feedback in the electrohydraulic operator controller comprises:

causing the electrohydraulic operator controller to vibrate; and varying the vibration based on the sensed property of the machine hydraulic function.

18. The method of claim 17, wherein controlling a machine hydraulic function using an electrohydraulic operator controller comprises:

sending an electrical signal to an electrohydraulic machine controller based on the physical positioning of the electrohydraulic operator controller, generating an output signal from the electrohydraulic machine controller based on the electrical signal from the electrohydraulic operator controller; and sending the output signal to control valves to control the machine hydraulic function; and wherein sensing a sensed property of the hydraulic function comprises:

sensing a sensed property of the machine hydraulic function using the electrohydraulic machine controller; and sending a sensor signal to a feedback mechanism, the sensor signal indicating the sensed property of the machine hydraulic function.

19. The method of claim 17, wherein varying the vibration based on the sensed property of the machine hydraulic function comprises varying the vibration according to the user-selectable profile.

20. The electrohydraulic controller feedback system of claim 1, wherein the tactile feedback increases for increasing values of the sensed property when the sensed property is less than the breakpoint, and the tactile feedback decreases for increasing values of the sensed property when the sensed property is greater than the breakpoint.

* * * * *